United States Patent Office 3,397,273
Patented Aug. 13, 1968

3,397,273
CONTROLLING PHYTOPATHOGENIC FUNGI ON PLANTS WITH 3-PYRIDYL METHANE DERIVATIVES
Earle M. Van Heyningen and Harold M. Taylor, Indianapolis, Ind., assignors to Eli Lilly and Company, Indianapolis, Ind., a corporation of Indiana
No Drawing. Filed Feb. 18, 1966, Ser. No. 528,374
7 Claims. (Cl. 424—263)

This invention relates to novel fungicidal compositions and to methods for the control of fungi. More particularly this invention relates to certain novel fungicidal compositions wherein a 3-pyridyl methane derivative is the fungicidally active ingredient.

That pyridyl methane derivatives possess antifungal and antibacterial properties is taught by Sperber et al., U.S. Patent 2,727,895 (Dec. 20, 1955), the preferred compounds therein being the 4-pyridyl methane derivatives in which the pyridine moiety is substituted in the 4-position, the compounds to be administered in a variety of the usual pharmaceutical forms, thus being directed toward human use. In very surprising contrast to this prior-art teaching, it has now been found that the 3-pyridyl methane derivatives are highly effective in activity against fungi pathogenic to plants while the 4-pyridyl methane derivatives are inactive.

Plant pathogenic fungi can in many instances cause considerable loss of agricultural and horticultural crops, and many compounds are in current use for controlling such fungi in order to diminish this loss. However, the compounds which have been available are by no means completely adequate, owing to the great variation of crops and of fungi pathogenic thereto. The search for more effective fungicides which do not adversely affect the crops therefore has continued.

The novel compositions of the present invention have been found to be useful in controlling fungi which attack food crops, ornamental plants, and turf.

Among the susceptible fungi which attack food crops are *Erysiphe polygoni*, the causative organism of bean powdery mildew; *Phytophthera infestans*, the causative organism of potato and tomato late blight; and *Colletotrichum lagenarium*, the causative organism of cucumber anthracnose.

The susceptible fungi which affect ornamental plants are exemplified by *Sphaerotheca pannosa* var. *rosae*, the causative organism of powdery mildew of rose.

The susceptible fungi which affect ornamental plants *tinia homeocarpa*, the causative organism of Turf Dollar Spot; *Rhizoctonia solani*, the causative organism of Turf Brown Patch; and *Helminthosporium sativum*, the causative organism of Leaf Spot.

It is an object of the present invention to provide novel fungicidal compositions and methods of controlling the growth of fungi pathogenic to food crops, ornamental plants, and turf. It is a further important object of the invention to provide compositions which are toxic to such fungi.

In fulfillment of the above and other objects, this invention provides novel processes which comprise applying to plant foliage a fungicidal amount of at least one 3-pyridyl methane derivative represented by the following formula:

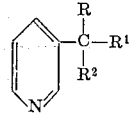

wherein

R is hydrogen, $C_1$–$C_3$ alkyl, cyano, carboxyl, carbo ($C_1$–$C_3$)-alkoxy, benzyl, or phenyl;

$R^1$ is benzyl, phenyl, pyridyl, pyridylmethyl, or thienyl;
$R^2$ is $C_3$–$C_6$ alkyl, $C_3$–$C_8$ cycloalkyl, benzyl, phenyl, pyridyl, or thienyl; or
a nonphytotoxic acid addition salt thereof.

$C_1$–$C_3$ alkyl can be illustratively methyl, ethyl, n-propyl, and isopropyl.

$C_3$–$C_8$ cycloalkyl means saturated cyclic aliphatic hydrocarbon radicals having 3 to 8 carbons in the ring and can be illustratively cyclopropyl, cyclobutyl, cyclopentyl, cyclohexyl, cycloheptyl, and cyclooctyl.

Pyridyl, except when expressly limited, can be 2-, 3-, or 4-pyridyl.

Thienyl can be 2- or 3-thienyl.

Halo can be illustratively chloro, bromo, fluoro, and iodo.

$C_3$–$C_6$ alkyl can be illustratively n-propyl, isopropyl, n-butyl, sec.-butyl, isobutyl, n-amyl, n-hexyl, sec.-amyl, n-hexyl, sec.-hexyl, and isohexyl.

Carbo($C_1$–$C_3$)alkoxy can be illustratively carbomethoxy, carbethoxy, and carbopropoxy.

The nonphytotoxic acid addition salts of the bases represented by the above formula can be prepared employing for example the following acids: hydrochloric, hydrobromic, sulfuric, phosphoric, nitric, oxalic, methanesulfonic, p-toluenesulfonic, maleic, and the like.

While the compounds useful in the novel compositions and processes of the present invention have been defined in terms of a structural formula which depicts the structural features of those compounds and which indicates the presence therein of certain well-known organic radicals, including benzyl, phenyl, pyridyl, and thienyl, it will be recognized by those skilled in the art that such radicals may bear one or more substituents without departing in any way from the spirit of the invention and without altering the properties of the compounds in such a way as would set them apart from the invention or take them outside of its scope. Compounds useful in the present invention and bearing such substituents are accordingly to be considered to lie within the scope of the invention. Among such substituent atoms and radicals are halo, nitro, $C_1$–$C_3$ alkyl, methoxy, ethoxy, methylmercapto, ethylmercapto, and the like.

Compounds coming within the scope of the generic formula above include but are not limited to the following:

α-α-Bis(4-iodophenyl)-3-pyridyl methane p-toluenesulfonate
α-Phenyl-α-(4-chlorobenzyl)-3-pyridyl methane
α-Phenyl-α-(2-thienyl)-3-pyridyl methane
α-(4-chlorophenyl)-α-(2-thienyl)-3-pyridyl methane maleate
α-(3,4-dichlorobenzyl)-α-(3-chlorophenyl)-3-pyridyl methane
α-(4-methylthiophenyl)-α-phenyl-3-pyridyl methane
3-(α-n-Butylbenzyl)pyridine
α-(4-ethoxyphenyl)-α-phenyl-3-pyridyl methane hydrobromide
α,α-Bis(4-ethylphenyl)-3-pyridyl methane oxalate
α,α-Bis(4-nitrophenyl)-3-pyridyl methane
α-(3-bromophenyl)-α-phenyl-3-pyridyl methane sulfate
α,α-Bis(3-bromophenyl)-3-pyridyl methane nitrate
α-Cyclopentyl-α-(4-chlorophenyl)-3-pyridyl methane
α-Cyclohexyl-α-(3-bromophenyl)-3-pyridyl methane
α-(2-chlorobenzyl)-α-cyclooctyl-3-pyridyl methane
α-Phenyl-α-(3-thienyl)-3-pyridyl methane
α-(4-chlorophenyl)-α-(2-pyridyl)-3-pyridyl methane
α-Cyano-α-phenyl-α-(3-thienyl)-3-pyridyl methane
Tri-(3-pyridyl)methane
α-Carboxy-α,α-bis(phenyl)-3-pyridyl methane
α-(Carboethoxy)-α-phenyl-α-(4-chlorophenyl)-3-pyridyl methane,
and the like.

In carrying out the method of the present invention, compositions containing the active ingredient are applied to the infected or susceptible plant surfaces. A convenient and preferred method is to spray the plant with a liquid dispersion or emulsion of the active ingredient.

The compositions useful in the method of the present invention desirably contain in addition to the novel toxicant one or more of a plurality of additaments including water, hydroxylated carriers, petroleum distillates, and other dispersion media, surface-active dispersing agents, emulsifiers, and finely divided inert solids. The concentration of the 3-pyridyl methane derivative in these compositions may vary depending on whether the composition is intended for direct application as a dust to plants or is intended as an emulsifiable concentrate or a wettable powder designed to be subsequently diluted with an additional inert carrier such as water to produce the ultimate treating composition.

The compounds of the present invention are applied to plants in effective amounts, varying somewhat with the severity of the fungus infection and with other factors such as the environment in which treatment is conducted. In general, it will be found that an aqueous spray containing from about ½ to about 400 p.p.m. of active material is satisfactory when treatment is to be carried out in the greenhouse.

As is well understood in the art, a somewhat higher concentration of the fungicide is desirable when treatment is to be carried out in the field. In that case, the preferred range is from about 1 to about 600 p.p.m. of active ingredient.

Treating compositions are most conveniently formulated by preparing liquid or solid concentrate compositions which are subsequently diluted to produce a composion of the desired concentration. Emulsifiable liquid concentrates may be prepared by incorporating from about 0.05 to about 5 percent of the active ingredient and an emulsifying agent in a suitable water-immiscible organic liquid. Such concentrates may be further diluted with water to form spray mixtures in the form of oil-in-water emulsions. Such spray compositions then comprise active toxicant, water-immiscible solvent, emulsifying agent, and water. Suitable emulsifying agents are preferably the nonionic or ionic types or blends thereof and include condensation products or alkylene oxides with phenols and organic acids, polyoxyethylene derivatives of sorbitan esters, complex ether-alcohols, ionics of the aralkyl-sulfonate type, and the like. Suitable organic liquids to be employed include aromatic hydrocarbons, aliphatic hydrocarbons, cycloaliphatic hydrocarbons, and mixtures thereof such as petroleum distillates.

Solid concentrate mixtures may be prepared by incorporating from about 10 to about 25 percent of the 3-pyridyl methane derivative in a finely divided solid carrier such as bentonite, fuller's earth, diatomaceous earth, hydrated silica, diatomaceous silica, expanded mica, talc, chalk, and the like. Such concentrates may be formulated, if desired, for direct use as dust-treating compositions, or may be diluted, if desired, with additional inert solid carriers to produce dusting powders containing around 0.05 to about 1 percent the weight of the 3-pyridyl methane derivative toxicant. Alternatively, dispersing and/or wetting agents may be incorporated along with the substituted pyridines in the solid carrier to form wettable powder concentrates ranging from 10 to 25 percent concentration which subsequently may be dispersed in water or in other aqueous carries to form spray compositions. Suitable wetting and emulsifying agents include sodium lignosulfate, sulfonate-oxide condensate blends, sulfonate nonionic blends, anionic wetting agents, and the like.

Further, the 3-pyridyl methane derivative toxicant may be incorporated in solutions, simple dispersions, aerosol formulations, and other media adaptable to be employed for treating vegetation.

In operating according to the method of the present invention, the toxicant composition is applied to infected or susceptible plant surfaces in any convenient fashion such as spraying, dusting, dipping, or drenching. The spray method is considered preferable especially when a large number of plants are involved, because of the rapidity and uniformity of treatment possible. In spraying, it is usually sufficient for the infected or susceptible surfaces to be thoroughly wet with the liquid dispersion employed. Good results have been obtained by employing spray compositions whether they be emulsions or aqueous dispersions of solid concentrates.

The following examples illustrate the invention but are not to be construed as limiting.

EXAMPLE 1

The effectiveness of compounds exemplified by the above formulas against *Erysiphe polygoni,* the causative organism of bean powdery mildew, was evaluated in the greenhouse in the following manner.

Fungicidal compositions were prepared by dissolving 40 mg. of the compound to be tested in 1 ml. of a solution of cyclohexanone containing 55 mg. of sulfonate nonionic blend (Toximul R and S, Stepan Chemical Company, Northfield, Ill.), and diluting to a volume of 100 ml. with water. This composition then contained 400 p.p.m. of fungicide. To prepare a composition containing 1000 p.p.m., 100 mg. of the compound to be tested was dissolved in 1 ml. of the cyclohexanone-sulfonate nonionic blend solution and then diluted to a volume of 100 ml. with water.

Three bean seeds (Kentucky Wonder variety) were planted in 4-inch clay pots and allowed to germinate, and the plants were thinned to two plants per pot. Ten days from the day of planting, the test chemicals, compounded as described above, were sprayed on all leaf surfaces of the bean plants and allowed to dry. The plants were then placed in the greenhouse and Kentucky Wonder beans heavily infested with powdery mildew were placed above them for about five days, after which they were removed. At the end of five additional days the plants were observed for development of the disease. The appearance of the treated plants was compared with that of the check plants and ratings of the control of the fungus were recorded. The control rating scale used was as follows:

0—no control
1—slight control
2—moderate control
3—good control
4—complete control, no fungus Chart 1 which follows sets forth the results of the testing of representative substituted 3-pyridyl methane derivatives against *Erisyphe polygoni.* In the chart, column 1 gives the name of the compound; column 2, the rate in terms of p.p.m. at which the compound was applied to the test plants; and column 3, the protection rating of the compound.

CHART 1

| Compound | Application Rate, p.p.m. | Protection Rating |
|---|---|---|
| α,α-Bis(4-chlorophenyl)-3-pyridyl methane | 400 | 4 |
| | 80 | 3.75 |
| | 16 | 2.6 |
| 3-diphenylmethyl-pyridine hydrochloride | 400 | 4 |
| | 80 | 4 |
| | 16 | 4 |
| α,α-Bis(4-chlorophenyl)-3-pyridyl methane hydrochloride | 400 | 4 |
| | 80 | 4 |
| | 16 | 3+ |
| | 3.2 | 2+ |

EXAMPLE 2

In a field trial, the ability of α,α-bis(4-chlorophenyl)-3-pyridyl methane to combat *Sclerotinia homeocarpa,* the causative organism of Turf Dollar Spot, was tested. The two compositions tested were: (1) a 25 percent wettable powder composition of α,α-bis(4-chlorophenyl)-3-pyridyl methane at rates of 0.8, 2.0, and 3.4 pounds per acre, and (2) a 2-pound-per-gallon emulsifiable concentrate diluted to give a treatment rate of 1.0 pound per acre. Five gallons of liquid per 1,000 square feet were used.

Twelve plots of ground, each having an area of 13.5 square feet, were used, comprising three plots each of Astoria variety of bentgrass. Highland variety of bentgrass, Seaside variety of bentgrass, and Penncross variety of bentgrass. A $CO_2$ pressure tank on a hand-pushed sulky rig forces spray through two T-Jet nozzles designed to spray a band 18 inches in width.

Each plot was observed for evidence of areas diseased with the Dollar Spot organism. The Barratt-Horsfall system of evalution was used and converted to percent values.

Results of the treatment are shown in Chart 2. Column 1 identifies the compound under test, referred to as EL-237; column 2 the number of the treatment; column 3, the type of formulation; column 4, the rate of application in terms of pounds of active ingredient per acre; columns 5, 6, 7, and 8, the percent of Dollar Spot disease observed.

CHART 2

| Compound | Treat. No. | Formulation | Rate, lb./acre | Percent Dollar Spot Disease in Varieties of Bentgrass | | | |
|---|---|---|---|---|---|---|---|
| | | | | Astoria | Highland | Seaside | Penncross |
| Control | 1 | | | 13 | 37 | 81 | 40 |
| EL-237 | 2 | 25% WP | 0.8 | 0 | 0 | 0 | 0 |
| EL-237 | 3 | 25% WP | 2.0 | 1 | 1 | 2 | 1 |
| EL-237 | 4 | 25% WP | 3.4 | 0 | 0 | 0 | 0 |
| EL-237 | 5 | 2 lb./gal. EC | 1.0 | 0 | 5 | 6 | 1 |

WP = Wettable powder.   EC = Emulsifiable concentrate.

EXAMPLE 3

A field trial was run to determine the efficacy of α,α-bis-(4-chlorophenyl)-3-pyridyl methane against *Erysiphe cichoracearum*, the causal organism of powdery mildew on squash.

The fungicidal compound was formulated as a 25 percent wettable powder and used at the rate indicated in Chart 3 which follows.

Squash, Early Yellow Crookneck variety, were planted in rows 30 feet long. Treatments were applied to alternate rows with the untreated rows acting as guard rows. Sprays were applied using a 3-gallon compression sprayer. Dusts were applied using a Hudson crank duster.

The liquid treatment was properly weighed or measured and brought up to a volume of one gallon and applied to 30 feet of row.

Evaluation of the incidence of the disease was made by two observers using the Barratt-Horsfall rating system.

Results are shown in Chart 3. Column 1 gives the name of the compound; column 2, the rate of the application; columns 3 and 4, the percent of powdery mildew observed.

CHART 3

| Compound | Application Rate | Incidence of Powdery Mildew | |
|---|---|---|---|
| | | Rep I, Percent | Rep II, Percent |
| Control | | 81.25 | 71.87 |
| α,α-Bis(4-chlorophenyl)-3-pyridyl methane | 50 p.p.m., 25% WP | 0.0 | 0.0 |

The 3-pyridyl methane derivatives useful in this invention can be prepared by any one of several methods.

Condensing two moles of benzene or a substituted benzene with pyridyl-3-carboxaldehyde in the presence of concentrated sulfuric acid yields 3-pyridyl diphenylmethane or 3-pyridyl di(substituted-phenyl)methane, respectively. The product is readily isolated from the reaction mixture by a conventional extraction procedure.

Alternatively, a diaryl 3-pyridine methanol is heated in a mixture of glacial acetic acid, concentrated hydrochloric acid, and 47 percent aqueous hydriodic acid to reduce the hydroxyl group, as taught by Sperber et al., U.S. Patent 2,727,895 (Dec. 20, 1955).

When the methane carbon atom is tetra-substituted, the compounds are prepared by alkylating the diaryl 3-pyridyl methanes in the presence of sodium or potassium amide in liquid ammonia.

That the synthesis of the compounds may be more fully comprehended, the following preparations are presented.

Preparation 1.—3-pyridyl diphenylmethane

A mixture of 39.0 g. (0.5 mole) of benzene and 60 ml. of concentrated sulfuric acid was prepared in a 500-ml. three-neck flask cooled in an ice bath. The temperature was maintained at below 30° C. and a solution of 17.6 g. (0.15 mole) of pyridine-3-carboxaldehyde in 20 ml. of benzene was added while keeping the temperature of the mixture between 20 and 30° C. The reaction product mixture was stirred for about an hour at the same temperature. When the reaction was no longer exothermic, the cooling bath was removed and the stirred reaction product mixture was heated in an oil bath at about 40–45° C. for about 16 hours. The reaction product mixture was poured over a large quantity of crushed ice, the mixture made basic by adding 50 percent sodium hydroxide solution along with ice in order to control the temperature, and the crude product extracted with chloroform. The chloroform solution was washed with water, dried, and evaporated in vacuo to give an oil. The oil was distilled in vacuo to yield 3-pyridyl diphenylmethane having a boiling point of 155° C. at 0.7 mm. It crystallized on standing and had a melting point of about 70–71.5° C.

A small amount of 3-pyridyl diphenylmethane was dissolved in ether and anhydrous hydrogen chloride gas added. The solid which separated was recrystallized from a mixture of ethanol and ether to yield 3-pyridyl diphenylmethane hydrochloride having a melting point of about 169–170° C.

Following the general procedure described in Preparation 1, the following compounds were prepared:

α,α-Bis(4-fluorophenyl)-3-pyridyl methane. Boiling point: 170–173° C./1.25 mm.

α,α-Bis(4-methyl-3-chlorophenyl)-3-pyridyl methane. Boiling point: 205° C./0.2 mm.

α,α-Bis(4-methoxyphenyl)-3-pyridyl methane. Boiling point: 211–213° C./0.5 mm.

α,α-Bis(p-tolyl)-3-pyridyl methane. Boiling point: 235° C./15 mm.

Preparation 2.—α,α-Bis(4-chlorophenyl)-3-pyridyl methane

A mixture of 11 g. of α,α-bis(4-chlorophenyl)-3-pyridinemethanol, 19 ml. of glacial acetic acid, 5 ml. of concentrated hydrochloric acid, and 20 ml. of aqueous 47 percent hydriodic acid was heated for about 4 hours. The reaction product mixture was poured into a mixture of 100 ml. of water and 8 g. of sodium bisulfite. The mixture was made strongly basic with aqeous concentrated sodium hydroxide and extracted with several volumes of ether. The combined ether extracts were dried, concentrated in vacuo and the residue distilled to yield α,α-bis(4-chlorophenyl)-3-pyridyl methane having a boiling point of about 160° C./0.05 mm. Yield: 8.0 gm. (90 percent of theory).

A small sample of α,α-bis(4-chlorophenyl)-3-pyridyl methane was dissolved in dry ether and the solution saturated in the cold with anhydrous hydrogen chloride gas. The solid which precipitated was filtered off and recrystallized from a mixture of ethanol and ether to yield α,α-bis(4-chlorophenyl)-3-pyridyl methane hydrochloride having a melting point of about 70° C.

Following the general procedure of Preparation 2, the following compounds were synthesized:

α-(4-chlorophenyl)-α-phenyl-3-pyridyl methane. Boiling point: 157° C./0.05 mm.

1 - phenyl - 1-(3-pyridyl)-2-(4-pyridyl)ethane. Melting point: 75–76° C.

3 - bis(2,4 - dichlorophenyl)methylpyridine hydrochloride. Melting point: 165° C.

3-(α-n-pentylbenzyl)pyridine. Boiling point: 131–135° C./0.05 mm. $n_D^{25}$=1.5443.

Preparation 3.—3-[α-methyl-α,α-bis(4-chlorophenyl)-methyl]pyridine hydrochloride Potassium amide was prepared by adding 3.90 g. (0.1 gram-atom) of potassium to a large excess of liquid ammonia in a reaction flask suitably equipped, and to the solution was added 31.4 g. (0.1 mole) of 3-[α,α-bis(4-chlorophenyl)methyl]-pyridine. The liquid ammonia was replaced with dry xylene and the mixture stirred for about 10 minutes, followed by the addition of 141.9 g. (1.0 mole) of methyl iodide. The reaction mixture was stirred for about 45 minutes.

The reaction product mixture was poured into water and the organic layer separated and washed several times with distilled water. The organic layer was concentrated to dryness at reduced pressure, the residue dissolved in ether, and the ether solution saturated in the cold with dry hydrogen chloride gas. The white solid which precipitated was filtered off and recrystallized from benzene to yield 3-[α-methyl-α,α-bis(4-chlorophenyl)methyl]pyridine hydrochloride having a melting point of about 165° C.

Following the general procedure of Preparation 3, the following compounds were prepared:

3-[α,α-bis(4-chlorophenyl)phenethyl]pyridine. Melting point: 126–128° C.

3 - [α,α-bis(4-chlorophenyl)phenethyl]pyridine hydrochloride. Melting point: 204–206° C.

We claim:

1. A method for protecting plants from attack by phytopathogenic fungi which comprises treating the plants with a fungicidally effective amount of a compound of the formula:

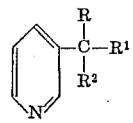

wherein

R is hydrogen, $C_1$–$C_3$ alkyl, cyano, carboxyl, carbo($C_1$–$C_3$)-alkoxy, benzyl, or phenyl;

$R^1$ is benzyl, phenyl, pyridyl, pyridylmethyl, or thienyl;

$R^2$ is $C_3$–$C_6$ alkyl, $C_3$–$C_8$ cycloalkyl, benzyl, phenyl, pyridyl, or thienyl; or a nonphytotoxic acid addition salt thereof.

2. The method of claim 1 wherein said compound is applied in combination with an inert diluent.

3. The method of claim 1 wherein said compound is applied in combination with an inert diluent and a wetting agent.

4. The method of claim 1 wherein said compound is applied in a composition containing within the range of about ½ to about 600 p.p.m. thereof.

5. The method of claim 1 wherein α,α-bis(4-methyl-3-chlorophenyl)-3-pyridyl methane is the fungicidally active compound.

6. The method of claim 1 wherein α,α-bis(4-chlorophenyl)-3-pyridyl methane hydrochloride is the fungicidally active compound.

7. The method of claim 1 wherein 3-diphenylmethylpyridine hydrochloride is the fungicidally active compound.

References Cited

UNITED STATES PATENTS 2,727,895   12/1955   Sperber et al. _____ 260—290

LEWIS GOTTS, *Primary Examiner.*

S. K. ROSE, *Assistant Examiner.*